(12) United States Patent
Fisch

(10) Patent No.: US 6,400,680 B1
(45) Date of Patent: Jun. 4, 2002

(54) DATA TRANSFORMATION OF THE INVERSE-FOURIER TYPE

(75) Inventor: Eberhard Fisch, Sunnyvale, CA (US)

(73) Assignee: Koninklijke Philips Electronics N.V., New York, NY (US)

( * ) Notice: Subject to any disclaimer, the term of this patent is extended or adjusted under 35 U.S.C. 154(b) by 0 days.

(21) Appl. No.: 09/000,667

(22) Filed: Dec. 30, 1997

(51) Int. Cl.[7] .................................................. H04J 11/00
(52) U.S. Cl. ...................................... 370/210; 370/203
(58) Field of Search ................................ 370/210, 203, 370/343, 481, 480, 479, 204, 205, 206, 208; 708/322, 323, 400, 401, 402; 382/250; 348/384, 395

(56) References Cited

U.S. PATENT DOCUMENTS

| 5,371,611 | A | * | 12/1994 | Kato et al. .................... 358/456 |
| 5,467,131 | A | * | 11/1995 | Bhaskaran et al. .......... 348/384 |
| 5,576,958 | A | * | 11/1996 | Kawakatsu et al. .......... 708/402 |
| 5,748,770 | A | * | 5/1998 | Hajjahmad et al. .......... 382/167 |
| 5,774,598 | A | * | 6/1998 | Sunshine et al. ............ 382/250 |
| 5,832,135 | A | * | 11/1998 | Merhav et al. .............. 382/260 |
| 5,872,866 | A | * | 2/1999 | Strongin et al. ............. 382/233 |
| 5,883,823 | A | * | 3/1999 | Ding .......................... 708/402 |

FOREIGN PATENT DOCUMENTS

EP          0854653 A2      7/1998

* cited by examiner

*Primary Examiner*—Dang Ton
*Assistant Examiner*—Brian Nguyen
(74) *Attorney, Agent, or Firm*—Russell Gross

(57) ABSTRACT

In a method of transforming an input data block (IDB) comprising frequency coefficients (CF) into an output data block (ODB) comprising spatial coefficients, the following steps are carried out. For each frequency coefficient (CF) which is not zero, an individual block of spatial coefficients (IB) is established on the basis of pre-stored data (PSD). The pre-stored data (PSD) pertains to a spatial pattern associated to the frequency coefficient (CF). The thus obtained individual blocks of spatial coefficients (IB) are accumulated to obtain the output data block (ODB). The method allows a transformation of the inverse-fourier type, such as an inverse discrete-cosine transformation for example, to be carried out with relatively little computational effort. The method is particularly suitable for use in video decoding applications.

9 Claims, 4 Drawing Sheets

PRE-STORED DATA

```
        CVA1  CVA2  CVA3  CVA4
00 →     0     0     0     0
01 →    -1    -2    -3    -4
10 →    -2    -4    -6    -8
11 →    -3    -6    -9   -12
```

PERIOD REGION ARRAY
```
00
00
01
01
10
10
11
11
```
[1,8] EXTENSION VECTOR

FIG. 5A

COEFFICIENT MAPPING ARRAY
```
00, 00,00,00,00,00,00,00,00
00, 00,00,00,00,00,00,00,00
01, 01,01,01,01,01,01,01,01
01, 01,01,01,01,01,01,01,01
10, 10,10,10,10,10,10,10,10
10, 10,10,10,10,10,10,10,10
11, 11,11,11,11,11,11,11,11
11, 11,11,11,11,11,11,11,11
```

FIG. 5B

VAL (CF) = 2 ⇒

$$\begin{bmatrix} 0 & 0 & 0 & 0 & 0 & 0 & 0 & 0 \\ 0 & 0 & 0 & 0 & 0 & 0 & 0 & 0 \\ -1 & -1 & -1 & -1 & -1 & -1 & -1 & -1 \\ -1 & -1 & -1 & -1 & -1 & -1 & -1 & -1 \\ -2 & -2 & -2 & -2 & -2 & -2 & -2 & -2 \\ -2 & -2 & -2 & -2 & -2 & -2 & -2 & -2 \\ -3 & -3 & -3 & -3 & -3 & -3 & -3 & -3 \\ -3 & -3 & -3 & -3 & -3 & -3 & -3 & -3 \end{bmatrix}$$ INDIVIDUAL BLOCK

FIG. 5C

DATA TRANSFORMATION OF THE INVERSE-FOURIER TYPE

FIELD OF THE INVENTION

The invention relates to data transformation of the inverse-fourier type such as, for example, an inverse discretecosine transformation. An input data block comprising frequency coefficients is transformed into an output data block comprising spatial coefficients. The invention also relates to a receiver in which a received data stream is subjected to various processing steps, one of the steps being a transformation of the inverse-fourier type. The received data stream may contain, for example, video information which has been coded in accordance with an MPEG standard.

BACKGROUND ART

U.S. Pat. No. 5,467,131 describes an inverse discretecosine transform (IDCT) implementation specifically for the decompression of JPEG, MPEG and Px64 encoded image and video data. A preprocessing step embedded in a Huffman decoding process classifies data blocks for sparseness. Each data block is defined as a sparse matrix H and is placed into one of the following classes based upon data occupancy within the data block:

type-0—only H[0,0] is non-zero;
type-1—only one of the H[i,j] is zero and H[0,0] is zero;
type-2—only an upper 2×2 submatrix of H has nonzero values, where some or all of H[0,0], H[0,1], H[1,0] and H[1,1] are non-zero;
type-3—only an upper 4×4 submatrix of H has non-zero values, where some or all of H[i,j], i=0,1, . . . ,3, j=0, 1, . . . ,3 are non-zero; and
type-4—H is not a member of any of the above-mentioned classes, where the occupancy pattern in H is random. The IDCT is based upon the data block classification. That is, pruned IDCTs are used for type-0,-1,-2 and -3 data blocks so as to reduce the total number of multiply and addition operations.

U.S. Pat. No. 5,467,131 describes a basic computation procedure for an inverse quantization and IDCT of an 8×8 data block. It requires 144 multiplication operations and 465 addition operations. For a type-0 or a type-1 8×8 data block, the multiply operation count is reduced to one multiply operation and the addition operation count is reduced to one addition operation. For a type-2 8×8 data block, the multiply operation count is reduced to 34 multiply operations and the addition operation count is reduced to 121 addition operations. For a type-3 8×8 data block, the multiply operation count is reduced to 61 multiply operations and the addition operation count is reduced to 253 addition operations. For a type-4 8×8 block, the basic computation procedure is applied. There are no savings in the number of required multiply and addition operations.

SUMMARY OF THE INVENTION

It is an object of the invention to provide a transformation of the above-identified type which allows a greater variety of input data blocks to be transformed into output data blocks with relatively little computational effort.

The invention takes the following aspects into consideration. Any given data block may be regarded as a linear combination of various basic data blocks each of which has a certain weighing factor. With regard to this, a transformation from the frequency domain to the spatial domain has the following property. If the basic data blocks are transformed individually and thereafter linearly combined using identical weighing factors, the result will be identical to the transformation of the given data block itself.

The transformation of an input data block in which all frequency-coefficients but one are zero, results in an output data block having spatial coefficients which follow a certain two-dimensional pattern. The pattern depends on the position in the input data block of the frequency coefficient which is not zero, but does not depend on the value of that frequency coefficient.

In accordance with the invention, an input data block transformed as follows. For each frequency coefficient which is not zero, an individual block of spatial coefficients is established on the basis of pre-stored data pertaining to a two-dimensional pattern associated to the frequency coefficient. The individual block of spatial coefficients may be, for example, the output data block which would be obtained if all other frequency coefficients in the input data block were zero. The individual blocks of spatial coefficients are accumulated to obtain the output data block.

It requires relatively little or no computational effort to provide the individual block of spatial coefficients for a certain frequency coefficient on the basis of the pre-stored data. For example, the pre-stored data may be the individual block of spatial coefficients itself in which case a simple read operation is sufficient to provide the individual block of spatial coefficients. As an other example, the pre-stored data may comprise a basic pattern associated to the frequency coefficient. In that case, the individual block of spatial coefficients can be obtained by copying the basic pattern which requires relatively little computational effort. In addition, it requires relatively little computational effort to accumulate the individual blocks of spatial coefficients. Thus, in the invention, an input data block can be transformed with relatively little computational effort.

In the invention, the computational effort which is required to transform an input data block increases substantially proportionally with the number of frequency coefficients which are not zero, whereas, in the background art, the computational effort increases to a much greater extent. Moreover, in the background art, an input data block can only be transformed with relatively little computational effort if non-zero frequency coefficients are located in a particular region. For example, let it be assumed that an input data block contains few non-zero coefficients which are located in the lower right portion of the input data block. In the background art, the input data block will be classified as type-4 and, cosnsequently, a relatively great computational effort is used to obtain the output data block. In the invention, the computational effort which is required to transform an input data block having a certain number of non-zero frequency coefficients, in principle, does not depend on where the non-zero frequency coefficients are located. For this reason, and because the computational effort increases with the number of non-zero frequency coefficients to a relatively small extent only. Consequently, the invention allows a greater variety of input data blocks to be transformed with relatively little computational effort.

The invention may be applied to advantage in a receiver in which a received data stream is subjected to a transformation of the inverse-fourier type such as, for example, an inverse discrete-cosine transformation. In practical applications, the transformation is carried out on successive blocks of data comprised in, or derived from, the received data stream. The transformation of a data block has to be carried out within a certain period of time to keep in pace with the rate at which new data blocks become available. Since, the invention allows a relatively great variety of data blocks to be transformed with relatively little computational effort, the transformation can be completed, on average, within relatively few clock cycles. Consequently, for a given clock frequency, the invention allows data blocks to be processed at a relatively high rate and, thus, the invention allows reception of data stream having relatively high bit rates. Alternatively, for a given data rate, the invention allows the transformation to be carried out at a relatively low clock frequency which contributes to a modest power consumption and to an interference-free operation.

The invention may be also applied to advantage in a data-processing arrangement which carries out a transformation of input data blocks comprising frequency coefficients into output data blocks comprising spatial coefficients. In practice, the number of operations which the data-processing arrangement can carry out per unit of time is limited. It has already been mentioned that the invention allows a relatively great variety of data blocks to be transformed with relatively little computational effort. Consequently, the invention allows more room for operations having an other purpose than transforming input data blocks. Thus, the invention contributes to the multi-tasking capabilities of the data-processing arrangement.

These and other aspects of the invention, as well as additional features which may be optionally used to implement the invention to advantage, are apparent from and will be elucidated with reference to the drawings described hereinafter.

BRIEF DESCRIPTION OF THE DRAWINGS

In the drawings:

FIGS. 5a, 5b and 5c illustrate an efficient manner in which an individual block of spatial coefficients can be provided of the basis of pre-stored data.

DETAILED DESCRIPTION OF THE DRAWINGS

First, some remarks will be made on the use of reference signs. Similar entities are denoted with an identical letter code throughout the drawings. In a single drawing, various similar entities may be shown. In that case, a numeral is added to the letter code, to distinguish similar entities from each other. The numeral will be between parentheses if the number of similar entities is a running parameter. In the description and the claims, any numeral in a reference sign may be omitted if this is appropriate.

Figure 1:
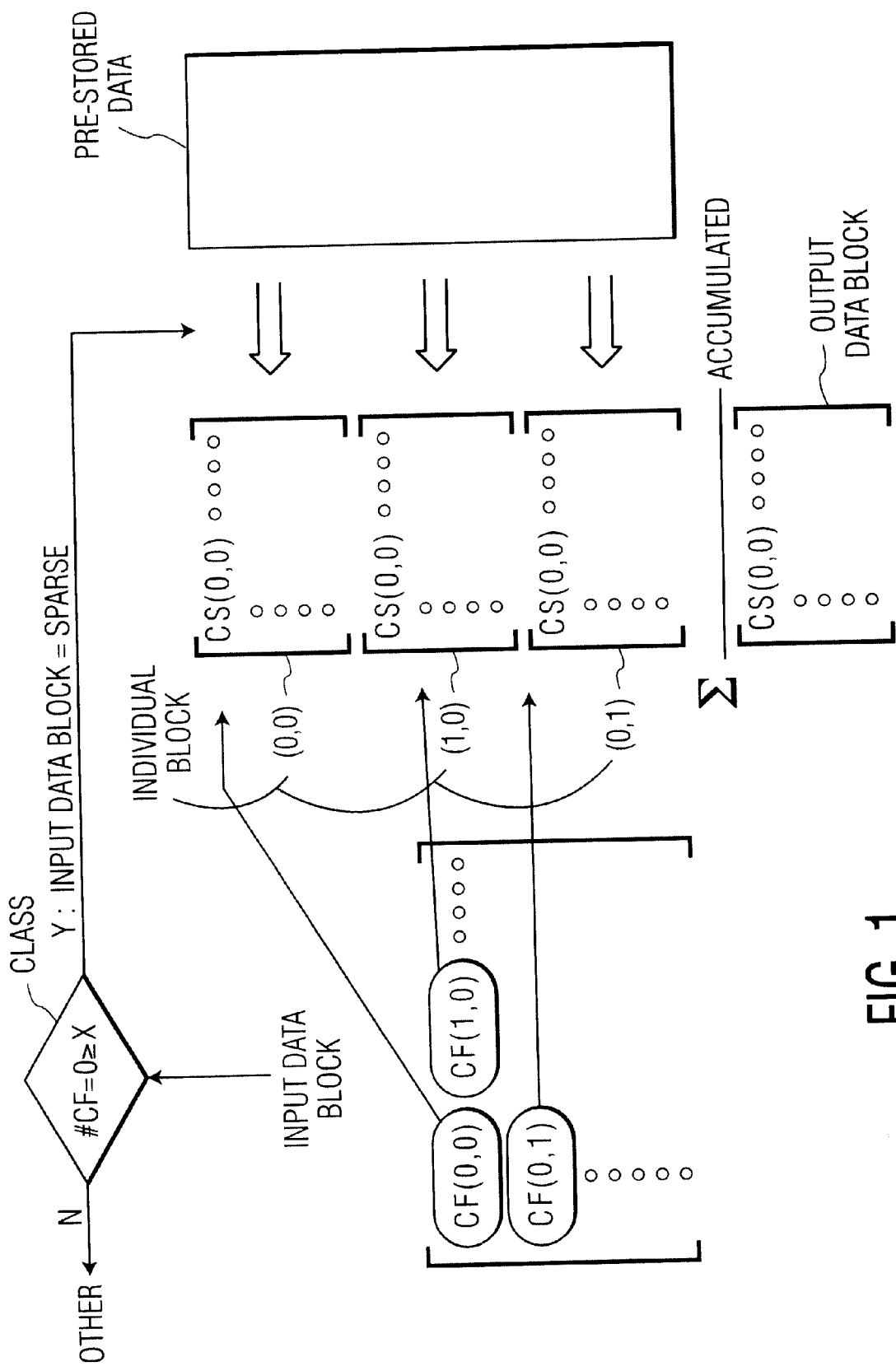
FIG. 1 illustrates basic features of the invention.

FIG. 1 illustrates basic features of the invention in full lines. An input data block IDB comprising frequency coefficients CF is transformed into an output data block ODB comprising spatial coefficients CS. For each frequency coefficient CF which is not zero, an individual block IB of spatial coefficients is established on the basis of pre-stored data PSD. The pre-stored data PSD pertains to a spatial pattern associated to the relevant frequency coefficient CF. The individual blocks IB of spatial coefficients are accumulated ACC to obtain the output data block ODB.

Figure 2:
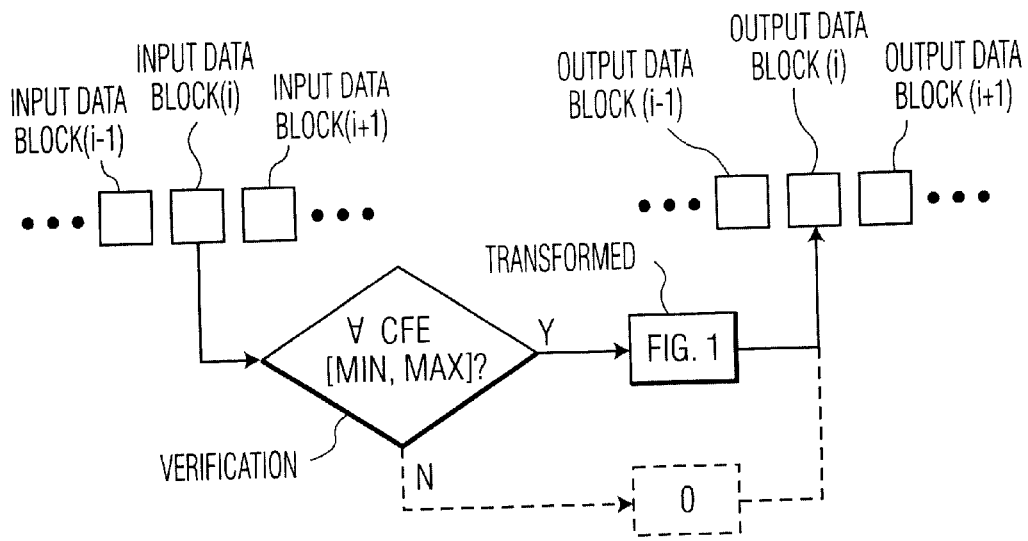
FIGS. 2, 3 and 4 illustrate additional features which may be optionally used to implement the invention to advantage.

FIG. 2 illustrates the following features. A series of input data blocks IDB each of which comprises frequency coefficients is transformed into a series of output data blocks ODB each of which comprises spatial coefficients. A verification VER is made if each frequency coefficient CF in an input data block IDB falls within a certain value range [MIN, MAX]. If so, the input data block IDB is transformed as illustrated in FIG. 1. It is evident that if the outcome of the verification VER is negative, the input data block IDB is transformed in another manner, for example, in accordance with a classic method as described in U.S. Pat. No. 5,467,131.

The following aspects have been taken into consideration with regard to the FIG. 2 features. In most data-processing arrangements, a multiplication is an order of magnitude more costly in terms of computational effort, than an addition or substraction. It is therefore preferable that the individual blocks of spatial coefficients can be provided without any scaling operations. In principle, this requires that an individual block of spatial coefficients is pre-stored for each possible value of a frequency coefficient in the input data block. Accordingly, the pre-stored data will have a considerable volume. For example, let it be assumed that the input data block comprises N by N frequency coefficients and that there are M unique values for each frequency coefficient. In principle, the pre-stored data should then comprise N×N×M individual blocks of spatial coefficients. Consequently, a relatively large memory will be needed.

If the FIG. 2 features are applied, there are relative few different values which a frequency coefficient may have in an input data block which is transformed as illustrated in FIG. 1. Consequently, if an individual block of spatial coefficients has to be pre-stored for each unique value, so as to avoid scaling operations, the total number of individual blocks which need to pre-stored is relatively modest. Consequently, the pre-stored data will have a relatively modest volume. Thus, the FIG. 2 features allows a relatively small memory and, thus, cost-efficiently.

The FIG. 2 features are particularly advantageous in video applications. In video applications, the frequency coefficients CF will generally have a relatively small value. For example, in MPEG-video applications, it has been found that an appreciable percentage of the input data blocks will contain only 4 or 5 non-zero frequency coefficients which have values comprised in a range between −5 and +5. Consequently, the use of the FIG. 2 features will not substantially reduce percentage of the input data blocks which are transformed as illustrated in FIG. 1. It has already been mentioned that a transformation as illustrated in FIG. 1 requires relatively little computational effort, and the FIG. 2 features allow a relatively small memory. Thus, in video applications, the FIG. 2 features contribute to an optimization in terms of computational effort and amount of memory required.

Figure 3:
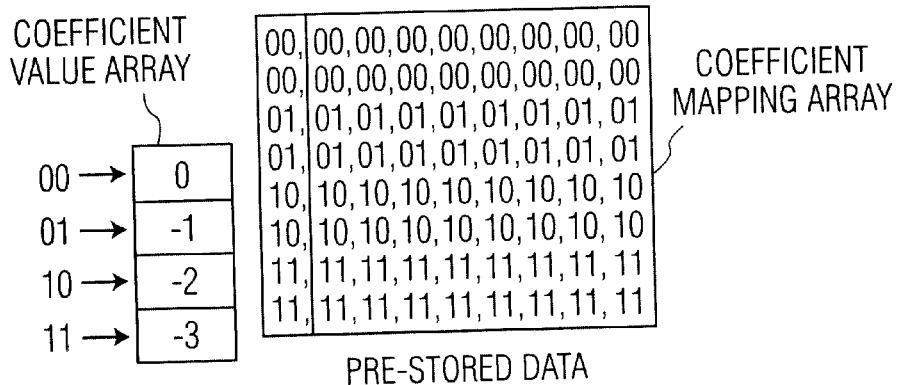

FIG. 3 illustrates the following additional feature. The pre-stored data comprises a coefficient value array CVA containing unique coefficient values and, a coefficient mapping array CMA for assigning the unique coefficient values to the spatial coefficients. By way of example, the following values are given in FIG. 3. The coefficient value array CVA comprises unique coefficient values 0, −1, −2 and −3, respectively. The coefficient mapping array CVA is in the form of an 8 by 8 matrix comprising 2-bit code words 00, 01, 10 and 11, respectively. Each position in the 8 by 8 matrix corresponds to a different spatial coefficient. The relation between the 2-bit code words and the coefficient values is as follows: 00->0, 01->−1, 10->−2, 11->−3.

The following aspects have been taken into consideration with regard to the FIG. 3 feature. In many individual blocks of spatial coefficients, there will be two or more different spatial coefficients having the same value. Thus, generally, the number of unique coefficient values is smaller the number of spatial coefficients comprised in the individual blocks. In order to provide individual blocks of spatial coefficients, it is sufficient to store the unique coefficient values and information for assigning a proper unique coefficient value to each of the spatial coefficients. For example, if there are K unique coefficient values in an N×N individual block of spatial coefficients, K and N being integers with K being smaller than N×N, a Ceiling[Log2K] bit code can be used to indicate for each spatial coefficient which value it should have.

If the FIG. 3 feature is applied, the pre-stored data will have a smaller size than if the pre-stored data were the individual blocks of spatial coefficients themselves. With reference to the values given by way of example in FIG. 3, storage of the coefficient mapping array CMA requires 64×2 bits and, assuming that the unique coefficient values are 8-bit words, storage of the coefficient value array CVA requires 4×8 bits. In contradistinction, if the pre-stored data were the individual block of spatial coefficients itself, 64×8 bits would be required. Thus, the FIG. 3 feature contributes to minimizing the amount of memory which is required.

An other reason why the FIG. 3 feature contributes to minimizing the amount of memory is as follows. For any given frequency coefficient in the input data block, the individual block of spatial coefficients will have a certain two-dimensional pattern which depends on the position of the frequency coefficient in the data block, but which does not depend on its value. That is, the value of the frequency coefficient has no influence on the values of the spatial coefficients in the individual block relative to each other. The value of the frequency coefficient only determines the absolute value of the spatial coefficients and may be regarded as a scaling factor.

If the FIG. 3 feature is applied, the coefficient mapping array will effectively comprise the two-dimensional pattern which is typical for the position of the relevant frequency coefficient. Consequently, for each frequency coefficient in the input data block, only one coefficient mapping array needs to be stored. To obtain an individual block of spatial coefficients for a particular value of the frequency coefficient, it is sufficient to provide, along with the coefficient mapping array, a coefficient value array for that particular value of the frequency coefficient. Coefficient value arrays will generally contain a small amount of data only. Thus, even if there are many different values which the frequency coefficient may have, the FIG. 3 feature allows that a relatively small amount of pre-stored data can provide an individual block of spatial coefficients for each of these values.

An other advantage of the FIG. 3 feature is as follows. It has already been established that individual blocks of spatial coefficients are preferably provided without any scaling operations, so as to minimize computational effort. It has also been established that the FIG. 3 feature allows that a relatively small amount of pre-stored data can provide an individual block of spatial coefficients for each different value that a frequency coefficient may have. If an individual block of spatial coefficients can be provided for each different value that a frequency coefficient may have, any scaling operation will not be required. Thus, the FIG. 3 feature contributes to an optimization in term of computational effort and amount of memory required.

Figure 4:
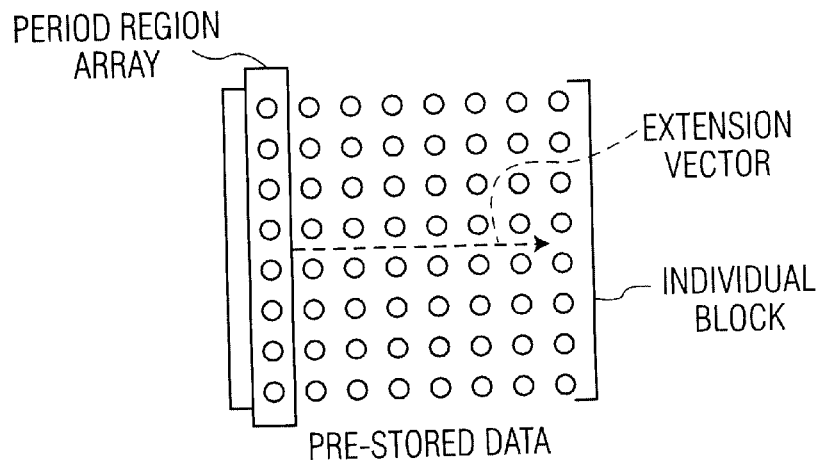

FIG. 4 illustrates the following additional feature. The pre-stored data comprises a period region array PRA comprising a sub-set of spatial coefficients of an individual block IB, the sub-set constituting a period region of the two-dimensional pattern for that individual block, and an extension vector EV for indicating the periodic repetition of the period region.

The following aspects have been taken into consideration with regard to the FIG. 4 feature. As already mentioned, the individual blocks of spatial coefficients have a certain two-dimensional pattern. This implies that there is a periodic minimal-sized two-dimensional period region. If we know the coefficient values of the two-dimensional pattern within the minimal-sized two-dimensional period region, it is possible to obtain the coefficient values for the rest of the individual block of coefficients by periodic extension. In other words, the individual block of coefficients can be obtained by simply copying the minimal-sized two-dimensional period region in the proper direction. This operation requires relatively little computational effort.

If the FIG. 4 feature is applied, the pre-stored data will have a smaller size than if the pre-stored data would comprise all the spatial coefficients of the individual block. In this respect, it should be noted that storage of the extension vector EV requires relatively little memory. Thus, the FIG. 4 feature contributes to minimizing the memory required for carrying out a transformation.

A further advantage of the FIGS. 2, 3 and 4 features is as follows. Most data-processing arrangements comprise a cache memory which is relatively fast. That is, the cache memory can provide a certain piece of data within a relatively short period. However, in many data-processing arrangements, the storage capacity of the cache memory is relatively small. It has already been established that, if any of the FIGS. 2, 3 or 4 features is applied, a smaller amount of pre-stored data will be sufficient for the transformation of the input data blocks. Consequently, the FIG. 2 feature contributes to fitting the pre-stored data in the cache memory of a certain data-processing arrangement. As a result, the FIG. 2 feature contributes to implementing the transformation by means of a data-processing arrangement while obtaining a satisfactory speed.

FIGS. 5a, 5b and 5c illustrate an example of how an individual block of spatial coefficients can be provided for a frequency coefficient CF on the basis of pre-stored data in accordance with the FIGS. 3 and 4 features. FIG. 5A illustrates the format of the pre-stored data PSD. The pre-stored data PSD comprises a period region array PRA composed of two-bit words. Each two-bit word represents a coefficient in a sub-set of spatial coefficients of the individual block which is provided. The sub-set constitutes a minimally-sized two dimensional period region of the individual block of spatial coefficients. The pre-stored data PSD also comprises a extension vector EV which has a value [1,8]. This value indicates that the minimally-sized two-dimensional period region, only occurs once in the vertical direction, and that it occurs eight times in the horizontal direction. That is, the period region array PRA comprises coefficients which belong to a column of the individual block of spatial coefficient to be provided. The pre-stored data PSD further comprises four coefficient value arrays CVA1, CVA2, CVA3 and CVA4. These arrays comprise unique values which the spatial coefficients of the individual block have, if the frequency coefficient has a value which is 1, 2, 3 or 4, respectively. Each coefficient value array CVA comprises four unique values at positions 00, 01, 10 and 11, respectively.

FIG. 5b illustrates the coefficient mapping array CMA which is obtained on the basis of the FIG. 5a period region array PRA and the accompanying extension vector EV. The coefficient mapping array CMA is obtained by copying the period region array PRA seven times in the horizontal direction only. This is as indicated by the extension vector EV because if the period region array PRA is copied seven times in the horizontal direction, it will occur eight times in that direction. Furthermore, if it is not copied in the vertical direction, it will occur only once in that direction.

FIG. 5c illustrates the individual block IB of spatial coefficients which is provided on the basis of the FIG. 5a pre-stored data PSD, if the frequency coefficient has the value two: VAL(CF)=2. If the frequency coefficient has the value 2, the coefficient value array CVA2 is used to provide the individual block of spatial coefficients. Each two-bits word in the FIG. 5b coefficient mapping array CMA is replaced by a coefficient value in the coefficient value array CVA2 which has a position corresponding to the two-bit word. If the frequency coefficient had a value of 3, the same procedure would apply, the only difference being that the coefficient value array CVA3 would be used instead of the coefficient value array CVA2. This illustrates an efficient manner in which the individual block of spatial coefficients can be provided on the basis of pre-stored data. The manner is particularly memory-efficient because each different value of the frequency coefficient requires a different coefficient value array only. This is all the more true, because to store a coefficient value array requires a relatively small amount of memory.

Figure 6:
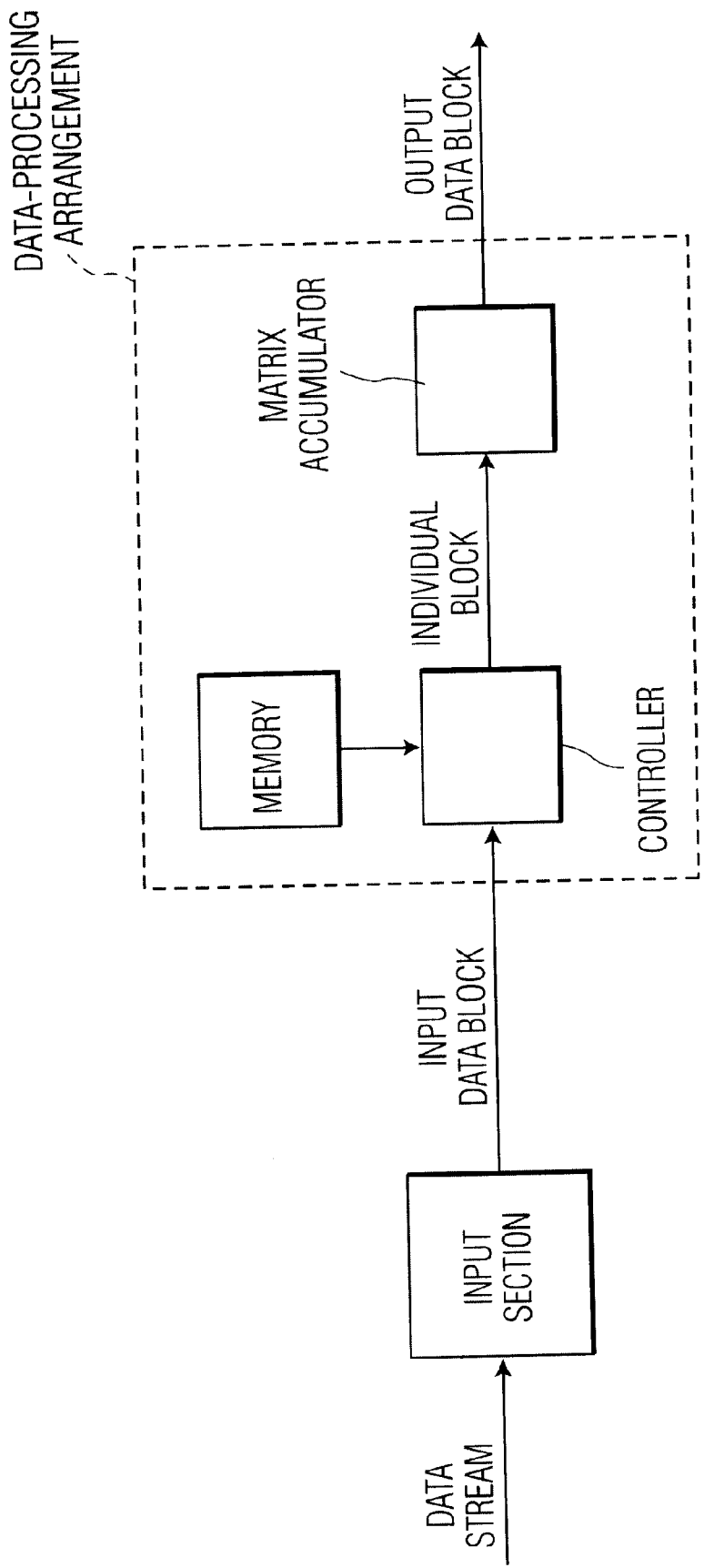
FIG. 6 illustrates an example of a receiver in accordance with the invention.

FIG. 6 illustrate an example of a receiver in accordance with the invention. The FIG. 6 receiver comprises the following main elements: an input section INP and a data-processing arrangement DPA. The data-processing arrangement DPA comprises a controller CON, a matrix accumulator MAC, and a memory MEM. The FIG. 6 receiver may be, for example, a television receiver suitable for receiving video signals which, for example, are coded in accordance with an MPEG standard. The receiver may also may also be, for example, a user terminal which is connected to a data transmission network via which coded video signals are transmitted.

The FIG. 6 receiver operates as follows. The input section INP receives a data stream DS which may contain, for example, MPEG-coded video information. The input section INP derives from the data stream DS input data blocks IDB comprising frequency coefficients. An input data block may be temporarily stored in a buffer memory, not shown, so as to provide the data-processing arrangement DPA the input data block in a parallel manner. The data-processing arrangement transforms the input data blocks IDB into output data blocks ODB comprising spatial coefficients. Thus, the data-processing arrangement DPA carries out a transformation of the inverse-fourier type which may be, for example, an inverse discrete-cosine transformation.

The controller CON classifies an input data block IDB of frequency coefficients according to sparseness, that is the number of frequency coefficients which are zero, and according to dynamic range, that is the range within which the values of the frequency coefficients lie. If the number of frequency coefficients which are non-zero is smaller than, for example, 10, and the frequency coefficients have values comprised in a range between, for example, −5 and +5, the input data block is classified as sparse. In that case, it will be further processed in accordance as described hereinafter. If the input data block IDB is not classified as sparse, the transformation will be carried out in an other manner, for example, using classical schemes.

For each new input data block, the controller CON initializes the matrix accumulator MAC to a constant value which is equal to a normalized version of the DC frequency coefficient in the input data block: CF[0,0]. Subsequently, the controller scans through the input data block for any remaining frequency coefficients which are not zero. If it encounters a non-zero frequency coefficient, the controller reads the value of that coefficient, its sign bit, if any, and its coordinates. The controller then provides an individual block of spatial coefficients IB for that frequency coefficient, on the basis of pre-stored data contained in the memory MEM. To that end, it uses the coordinates and the value of the frequency coefficient to read out a particular portion of the memory. For example, with reference to FIG. 5a, the coordinates may determine which period region array PRA is read out and extension vector EV associated thereto, and the value may determine which coefficient value array CVA is read out. If the sign bit indicates a positive value of the frequency coefficient, the individual block of spatial coefficients IB will be added to the data. For example, the pre-stored data may be in the form of calculation coefficients for use in a simplified inverse discrete-cosine transformation which establishes individual blocks of spatial coefficients. To that end, the calculation described in U.S. Pat. No. 5,467,131 for TYPE-2 blocks may be used in the matrix accumulator MAC. If the sign bit indicates a negative value, the individual block of frequency coefficients will be subtracted from the data in the matrix accumulator. The controller continues to scan, and to perform the subsequent steps described hereinbefore, until it encounters an end-of-block code. If then provides the data contained in the matrix accumulator as an output data block which may be further processed.

With regard to MPEG applications the following should be noted. The classification step can be carried out directly on a modified version of the MPEG RUN/LEVEL format where RUN values are replaced by [x,y] coordinates for indicating the position for the LEVEL value in the 8 by 8 matrix. The RUN/LEVEL format blocks may be modified in that the 6-bit RUN values are replace by a 6-bit [x,y] coordinate for the actual position of a non-zero coefficient in the input data block, which produces no additional data expansion.

The drawings and their description hereinbefore illustrate rather than limit the invention. It will be evident that there are numerous alternatives which fall within the scope of the appended claims. In this respect, the following closing remarks are made.

There are numerous ways of physically spreading functions or functional elements over various units. In this respect, the drawings are very diagrammatic, each representing only one possible embodiment of the invention. For example, with reference to FIG. 6, the input section INP may wholly or partially be included in the data-processing arrangement.

It should be noted that there are numerous different formats which may be used for the pre-stored data. All what matters is that individual blocks of spatial coefficients can be provided on the basis of the pre-stored data.

What is claimed is:

1. A data-processing arrangement for transforming an input data block comprising frequency coefficients into an output data block comprising spatial coefficients, the data-processing arrangement comprising:

a memory containing pre-stored data pertaining to spatial patterns associated to respective frequency coefficients;

a controller for verifying if the input data block includes less than or equal to a predetermined number of frequency coefficients being non-zero and includes frequency coefficients each having a value within a predetermined range, if so, establishing for each frequency coefficient which is non-zero and having a value within the predetermined range, an individual block of spatial coefficients on the basis of the pre-stored data, if the input data block includes more than the predetermined number of frequency coefficients being non-zero or includes frequency coefficients each having a value not within the predetermined range, transforming the input data block by means of computation;

an accumulator for accumulating individual blocks of spatial coefficients to obtain the output data block.

2. A data-processing arrangement as claimed in claim 1, wherein the pre-stored data comprises:

a coefficient value array containing unique coefficient values; and a coefficient mapping array for assigning the unique coefficient values to spatial coefficients.

3. A data-processing arrangement as claimed in claim 1, wherein the pre-stored data comprises:

a period region array comprising a sub-set of spatial coefficients of an individual block, the sub-set constituting a period region of a two-dimensional pattern for that individual block; and an extension vector for indicating the periodic repetition of the period region.

4. A receiver in which a received data stream is subjected to a transformation of the inverse-fourier type, the receiver comprising:

an input section for deriving from the received data stream, input data blocks comprising frequency coefficients;

a memory containing pre-stored data pertaining to spatial patterns associated to respective frequency coefficients;

a controller for verifying if an input data block includes less than or equal to a predetermined number of frequency coefficients being non-zero and includes frequency coefficients each having a value within a predetermined range, if so, establishing for each non-zero frequency coefficient and having a value within the predetermined range in the input data block, an individual block of spatial coefficients on the basis of the pre-stored data, if the input data block includes more than the predetermined number of frequency coefficients being non-zero or includes frequency coefficients each having a value not within the predetermined range, transforming the input data block by means of computation;

an accumulator for accumulating individual blocks of spatial coefficients to obtain an output data block.

5. A receiver as claimed in claim 4, wherein the pre-stored data comprises:

a coefficient value array containing unique coefficient values; and a coefficient mapping array for assigning the unique coefficient values to spatial coefficients.

6. A receiver as claimed in claim 4, wherein the pre-stored data comprises:

a period region array comprising a sub-set of spatial coefficients of an individual block, the sub-set constituting a period region of a two-dimensional pattern for that individual block; and an extension vector for indicating the periodic repetition of the period region.

7. A method of transforming an input data block comprising frequency coefficients into an output data block comprising spatial coefficients, the method comprising the step of:

verifying if the input data block includes less than or equal to a predetermined number of frequency coefficients being non-zero and includes frequency coefficients each having a value within a predetermined range, if so;

establishing, for each frequency coefficient which is non-zero and having a value within the predetermined range, an individual block of spatial coefficients on the basis of pre-stored data pertaining to a spatial pattern associated to the frequency coefficient;

accumulating individual blocks of spatial coefficients to obtain the output data block; and if the input data block includes more than the predetermined number of frequency coefficients being non-zero or includes frequency coefficients each having a value not within the predetermined range, transforming the input data block by means of computation.

8. A method of transforming as claimed in claim 7, wherein the pre-stored data comprises:

a coefficient value array containing unique coefficient values; and a coefficient mapping array for assigning the unique coefficient values to spatial coefficients.

9. A method of transforming as claimed in claim 7, wherein the pre-stored data comprises:

a period region array comprising a sub-set of spatial coefficients of an individual block, the sub-set constituting a period region of a two-dimensional pattern for that individual block; and an extension vector for indicating the periodic repetition of the period region.

* * * * *